Patented July 27, 1937

2,088,035

UNITED STATES PATENT OFFICE 2,088,035

SYNTHETIC RESIN COMPOSITION

Sydney Leonard Morgan Saunders, London, England

No Drawing. Application March 2, 1935, Serial No. 9,104. In Great Britain April 26, 1934

4 Claims. (Cl. 260—4)

This invention relates to synthetic resin compositions suitable for varnishes.

It is known that when a phenol is allowed to react with an aldehyde, such as formaldehyde, in the presence of catalysts, resins are formed which are suitable for use as coatings, which use however, is restricted by their solubility and flexibility.

Various processes have been proposed hitherto for preparing phenol-aldehyde resins which are soluble in vegetable oils. These methods involve heating the fusible phenol-aldehyde condensation products with esters, or partial esters, of polyhydric alcohols. Partial esters of polyhydric alcohols such as glycerol with linoleic acid as well as with phthalic acid have been proposed in this connection, (see, for example, British specification No. 370,946).

In all cases, in order to obtain the reaction between the acidic condensate and the partial ester, it is necessary to employ a high temperature (200° C. to 300° C.) for a considerable time as otherwise the esterification is far from complete.

It has now been discovered that by dissolving, at a moderately low temperature (150° C.) a fusible phenol-aldehyde condensation product in a partial ester, and then instead of causing the free hydroxyl groups of the partial ester to react with the condensation product, to esterify then with an organic acid or anhydride, greatly improved synthetic resin compositions are produced, which are soluble in vegetable oils, and which can be used in the preparation of varnishes and coating compositions.

According to the present invention, a process for preparing an oil soluble synthetic resin composition comprises dissolving at a temperature at which no substantial esterification will occur, an oil insoluble fusible phenol-aldehyde resin in a partial ester of a polyhydric alcohol and thereafter esterifying the free hydroxyl groups.

The acid constituent of the ester is preferably a monobasic acid such as acetic acid or a vegetable oil acid and the free hydroxyl groups are preferably esterified with a polybasic organic acid or anhydride, and the esterification of these hydroxyl groups is effected by heating to a temperature well above 200° C. sufficient to effect such esterification.

The partial ester of the polyhydric alcohol may be prepared from any polyhydric alcohol containing three or more hydroxyl groups, and any monobasic organic acid such as acetic, benzoic, or the acids derived from fats, vegetable oils and naturally occurring resins.

The phenol aldehyde condensation products may be prepared from phenol or any substituted phenol or mixture such as cresol, cresylic acid, para tertiary butyl phenol, or from any polynuclear phenol, in the presence of acid, or alkaline or neutral media such that the product is still in an easily fusible condition.

The invention also includes a process whereby vegetable oils such as linseed oil or tung oils, may be introduced at any stage during the condensation.

The invention also includes a process whereby the condensation is carried out in the presence of an inert gas.

The invention further includes lacquers and varnishes comprising synthetic resin compositions prepared according to the preceding paragraphs.

The following examples illustrate the nature of the invention but do not restrict it to these examples. The parts are by weight:—

Example 1

20 parts of a fusible resin prepared from o-cresol and formalin in the presence of an alkaline catalyst are dissolved in 40 parts of glyceryl mono linoleate and heated to 150° C., until perfectly bright. 15 parts of phthalic anhydride are added and the reaction mixture heated to 230° C., for 1 to 2 hours. The resulting resin is soluble in vegetable oils.

Example 2

25 parts of a fusible resin obtained from para tertiary butyl phenol and formaldehyde in the presence of an alkaline catalyst, are dissolved in 20 parts of glyceryl mono linoleate and heated to 150° C. until bright. 9 parts of phthalic anhydride are added, and the reaction mixture heated at 250° C. for 1 to 2 hours. The resulting resin is soluble in vegetable oils in all proportions.

Example 3

25 parts of a fusible resin obtained from para cresol and formalin in the presence of an acid catalyst are dissolved in 20 parts of glyceryl mono linoleate and heated to 150° C. until bright, 9 parts of phthalic anhydride are added and the temperature raised to 200° C., when 40 parts of China-wood oil are added. The heating is continued for 1 hour at 200° C. and then for a further 1 hour at 250° C., when it is allowed to cool, thinners and driers are added to produce a varnish which air dries in 8 hours to a tough flexible film.

Example 4

40 parts of a fusible resin obtained from para cresol and formalin in the presence of an alkaline catalyst are dissolved at 150° C. in 50 parts of glyceryl mono linoleate, 10 parts of phthalic anhydride are added and the temperature raised to 200° C. when 80 parts of China-wood oil are added, and the condensation continued for 1 hour. The temperature is then raised to 250° C. for 1 hour and after cooking, the resultant resinous mass is thinned with solvents, driers added to produce an air drying varnish. The condensation is carried out in the presence of carbon dioxide.

I claim:

1. A process for preparing an oil soluble synthetic resin composition consisting of first dissolving at 150° C. a fusible condensation product produced from reactants consisting of a phenol and formaldehyde in a partial ester of a drying fatty oil acid and a polyhydric alcohol, which ester contains at least two free hydroxyl groups and then adding a sufficient quantity of phthalic anhydride to esterify the free hydroxyl groups and heating to a temperature sufficient to effect such esterification.

2. The process for preparing an oil soluble synthetic resin composition consisting of first dissolving at 150° C. a fusible condensation product produced from reactants consisting of a phenol and formaldehyde in glycerol monolinoleate then adding a sufficient quantity of phthalic anhydride to esterify the free hydroxyl groups and heating to a temperature sufficient to effect such esterification.

3. The process set forth in claim 1 in which the phenol reactant is o-cresol.

4. The process set forth in claim 1 in which the phenol reactant is para cresol.

SYDNEY LEONARD MORGAN SAUNDERS.